United States Patent
Shi (10) Patent No.: US 9,020,017 B2
(45) Date of Patent: Apr. 28, 2015

(54) SIGNAL PROCESSING METHOD, DEVICE AND SYSTEM

(71) Applicant: Huawei Technologies Co., Ltd., Shenzhen (CN)

(72) Inventor: Cao Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/162,260

(22) Filed: Jan. 23, 2014

(65) Prior Publication Data

US 2014/0133534 A1 May 15, 2014

Related U.S. Application Data

(63) Continuation of application No. PCT/CN2011/077787, filed on Jul. 29, 2011.

(51) Int. Cl.
*H04B 3/46* (2006.01)
*H04B 17/00* (2006.01)
*H04Q 1/20* (2006.01)
*H04B 3/32* (2006.01)
*H04M 3/34* (2006.01)

(52) U.S. Cl.
CPC .. *H04B 3/32* (2013.01); *H04M 3/34* (2013.01)

(58) Field of Classification Search
CPC ................................. H04B 3/32; H04M 3/34
USPC ......................... 375/224, 227, 285
See application file for complete search history.

(56) References Cited

U.S. PATENT DOCUMENTS

| 8,351,598 B2 * | 1/2013 | Raheja et al. ................. 379/417 |
| 2009/0245335 A1 | 10/2009 | Fang ............................. 375/222 |
| 2009/0245444 A1 | 10/2009 | Fang ............................. 375/350 |
| 2009/0296792 A1 | 12/2009 | Fang ............................. 375/220 |
| 2011/0058468 A1 * | 3/2011 | Singh et al. .................. 370/201 |
| 2012/0134397 A1 * | 5/2012 | Cioffi et al. .................. 375/222 |
| 2012/0207197 A1 * | 8/2012 | Lv et al. ....................... 375/224 |
| 2012/0237012 A1 | 9/2012 | Fang et al. ................. 379/93.01 |
| 2012/0294348 A1 * | 11/2012 | Kuipers et al. ................ 375/224 |

(Continued)

FOREIGN PATENT DOCUMENTS

| CN | 101197592 A | 6/2008 |
| CN | 101197593 A | 6/2008 |

(Continued)

OTHER PUBLICATIONS

International Search Report issued May 3, 2012 in corresponding International Patent Application No. PCT/CN2011/077787.

(Continued)

*Primary Examiner* — Freshteh N Aghdam
(74) *Attorney, Agent, or Firm* — Staas & Halsey LLP (57) ABSTRACT

A signal processing method, device, and system are provided. The method includes: sending, through a first user port, a crosstalk detection signal in a connected line, and receiving, through a second user port, an error sample of an actual downlink signal fed back by a terminal side in a connected line; and estimating, according to the actual downlink signal and the crosstalk detection signal, a coefficient of a pre-coder of a DSLAM to obtain an estimated coefficient of the pre-coder, where the coefficient of the pre-coder is used to cancel far-end crosstalk on the line connected to the second user port when the first user port sends an SELT signal.

12 Claims, 4 Drawing Sheets

A DSLAM sends, through a first user port, a crosstalk detection signal in a connected line, and receives, through a second user port, an error sample of an actual downlink signal fed back by a terminal Side in a connected line, where the actual downlink signal includes far-end crosstalk imposed by the crosstalk detection signal to the line connected to the second user port — 101

The DSLAM estimates, according to the error sample of the actual downlink signal and the crosstalk detection signal, a coefficient of a pre-coder of the DSLAM to obtain an estimated coefficient of the pre-coder, where the coefficient of the pre-coder is used to cancel far-end crosstalk on the line connected to the second user port when the first user port sends an SELT signal — 102

(56) References Cited

U.S. PATENT DOCUMENTS

2013/0010931 A1* 1/2013 Berg et al. ............... 379/22
2013/0170629 A1* 7/2013 Flowers et al. ............ 379/23

FOREIGN PATENT DOCUMENTS

| | | | |
|---|---|---|---|
| CN | 101197798 | A | 6/2008 |
| CN | 101453245 | A | 6/2009 |
| CN | 101917212 | A | 12/2010 |
| CN | 102111186 | A | 6/2011 |
| EP | 2 293 535 | | 3/2011 |
| WO | 03/026160 | A2 | 3/2003 |
| WO | WO 2008/030145 | | 3/2008 |

OTHER PUBLICATIONS

Chinese Office Action issued Mar. 27, 2013 in corresponding Chinese Patent Application No. 201180001195.6.
International Search Report issued on May 3, 2012 in International Application No. PCT/CN2011/077787.
Extended European Search Report issued in Jul. 22, 2014 in corresponding European Patent Application No. 11 858 917.5.
Raphael Cenrillon et al: "Challenges and Solutions in Vectored DSL", Lecture Notes of the Institute for Cimputer Sciences, Social Informatics and Telecommunications Engineering; Access Networks: 4$^{th}$ International Conference. Accessnets 2009; Revised Selected, vol. 37, Feb. 17, 2010, pp. 192-203, CP009170553.

* cited by examiner

A DSLAM sends, through a first user port, a crosstalk detection signal in a connected line, and receives, through a second user port, an error sample of an actual downlink signal fed back by a terminal Side in a connected line, where the actual downlink signal includes far-end crosstalk imposed by the crosstalk detection signal to the line connected to the second user port ~101

The DSLAM estimates, according to the error sample of the actual downlink signal and the crosstalk detection signal, a coefficient of a pre-coder of the DSLAM to obtain an estimated coefficient of the pre-coder, where the coefficient of the pre-coder is used to cancel far-end crosstalk on the line connected to the second user port when the first user port sends an SELT signal ~102

FIG. 1

A DSLAM sends, through a first user port, a crosstalk detection signal in a connected line ~201

A user terminal corresponding to the line connected to the second user port of the DSLAM receives an actual downlink signal in the connected line, and obtains an error sample $E_{DS}$ of the actual downlink signal according to the actual downlink signal ~202

The user terminal corresponding to the line connected to the second user port of the DSLAM feeds back the error sample $E_{DS}$ to the DSLAM through a feedback channel ~203

The DSLAM estimates, according to the error sample $E_{DS}$ and the crosstalk detection signal, a coefficient of a pre-coder of the DSLAM to obtain an estimated coefficient of the pre-coder ~204

SIGNAL PROCESSING METHOD, DEVICE AND SYSTEM

CROSS-REFERENCE TO RELATED APPLICATIONS

This application is a continuation of International Application No. PCT/CN2011/077787, filed on Jul. 29, 2011, which is hereby incorporated by reference in its entirety.

TECHNICAL FIELD

Embodiments of the present invention relate to the field of communication technologies, and in particular, to a signal processing method, device, and system.

BACKGROUND

Digital subscriber line (Digital Subscriber Line, DSL for short) is a high speed data transmission technology in an unshielded twisted pair (Unshielded Twisted Pair, UTP for short) transmission. Various types of DSLs may be collectively referred to as an xDSL. Apart from a DSL using baseband transmission, the xDSL using passband transmission enables, by using a frequency division multiplexing technology, the xDSL to coexist with a plain old telephone service (Plain Old Telephone Service, POTS for short) in the same twisted pair. The xDSL occupies a high frequency band, and the POTS occupies a baseband part smaller than 4 kHz. A DSL access multiplexer (DSL Access Multiplexer, DSLAM for short) can provide access services for multiple xDSLs.

When a user subscribes to an xDSL service, line activation rate should be considered. That is, at an office, the xDSL service cannot be normally provisioned in all user twisted pairs. The main cause of the line activation rate problem is as follows: Due to electromagnetic induction, interference, which is also referred to as crosstalk (Crosstalk), occurs between multiple DSL signals accessed by the DSLAM. The crosstalk includes near-end crosstalk (near-end crosstalk, NEXT for short) and far-end crosstalk (far-end crosstalk, FEXT for short). Because energy of the crosstalk is enhanced with the increase of a frequency band, the far-end crosstalk affects the transmission performance of a line more seriously with the increase of the frequency band used by the xDSL. Therefore, when multiple users in one cable binder request to subscribe to the xDSL service, the far-end crosstalk brings about such problems to some lines as low rate, unstable performance, and even service provision failure, and finally causes a problem of low line activation rate. For lines where the xDSL service cannot be provisioned, an operator needs to perform troubleshooting. This process needs to consume a lot of human and material resources, which greatly increases operation costs of the operator. Therefore, a single end line test (Single End Line Test, SELT for short) technology is emerging. The SELT is a technology used to perform testing, checking, and fault locating on a line in an automatic test manner.

During the implementation of the present invention, the inventor discovers that the prior art has at least the following problems:

An SELT test signal is generally sent within a relatively wide spectrum range, and the sent signal imposes crosstalk on neighboring lines, leading to problems such as generation of bit errors in the neighboring lines or even offline in severe cases.

SUMMARY

Embodiments of the present invention provide a signal processing method, device, and system to solve the problem in the prior art that crosstalk is imposed to neighboring lines when an SELT test signal is sent.

An embodiment of the present invention provides a signal processing method, including:

sending, by a digital subscriber line access multiplexer DSLAM, through a first user port, a crosstalk detection signal in a connected line, and receiving, by the DSLAM, through a second user port, an error sample of an actual downlink signal fed back by a terminal side in a connected line, where the actual downlink signal includes far-end crosstalk imposed by the crosstalk detection signal to the line connected to the second user port; and estimating, by the DSLAM, according to the error sample of the actual downlink signal and the crosstalk detection signal, a coefficient of a pre-coder of the DSLAM to obtain an estimated coefficient of the pre-coder, where the coefficient of the pre-coder is used to cancel far-end crosstalk on the line connected to the second user port when the first user port sends a single end line test SELT signal.

An embodiment of the present invention provides a digital subscriber line access multiplexer DSLAM, including:

a first transceiver module, configured to send a crosstalk detection signal;

a second transceiver module, configured to receive an error sample of an actual downlink signal fed back by a terminal side, where the actual downlink signal includes far-end crosstalk imposed by the crosstalk detection signal to a line connected to the second transceiver module; and an estimating module, configured to obtain an estimated coefficient of a pre-coder according to the crosstalk detection signal sent by the first transceiver module and the error sample of the actual downlink signal received by the second transceiver module, where the coefficient of the pre-coder is used to cancel far-end crosstalk on the line connected to the second transceiver module when the first transceiver module sends a single end line test SELT signal.

An embodiment of the present invention further provides a signal processing system, including a digital subscriber line access multiplexer DSLAM and a user terminal The DSLAM is configured to send, through a first user port, a crosstalk detection signal in a connected line; receive, through a second user port, an error sample of an actual downlink signal fed back by the user terminal in a connected line, where the actual downlink signal includes far-end crosstalk imposed by the crosstalk detection signal to the line connected to the second user port; and estimate, according to the error sample of the actual downlink signal and the crosstalk detection signal, a coefficient of a pre-coder of the DSLAM to obtain an estimated coefficient of the pre-coder, where the coefficient of the pre-coder is used to cancel far-end crosstalk on the line connected to the second user port when the first user port sends a single end line test SELT signal.

The user terminal is configured to estimate, according to a received actual downlink signal which is sent through the second user port by the DSLAM in the connected line, an error sample of the actual downlink signal, and feed back the error sample of the actual downlink signal to the DSLAM.

In the signal processing method, device, and system provided in the embodiments of the present invention, before an SELT signal is sent, a crosstalk detection signal is sent, and a coefficient of a pre-coder of a DSLAM is estimated to obtain an estimated coefficient of the pre-coder; and then when an SELT test signal is sent, the estimated coefficient of the pre-coder is used to cancel far-end crosstalk possibly suffered by a line. In this way, the problem in the prior art that the SELT test signal imposes crosstalk on neighboring lines is effectively solved.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
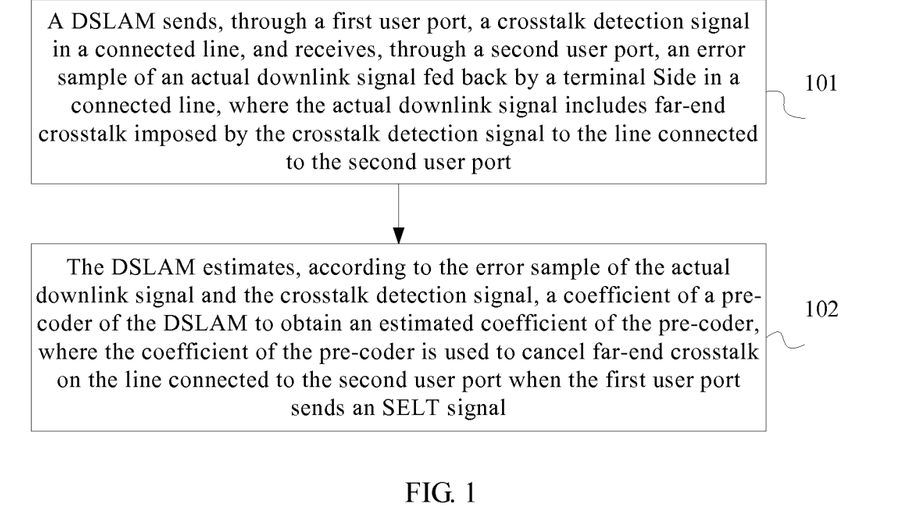
FIG. 1 is a flowchart of a signal processing method according to an embodiment of the present invention.

FIG. 1 is a flowchart of a signal processing method according to an embodiment of the present invention. As shown in FIG. 1, the method includes the following steps:

Step 101: A DSLAM sends, through a first user port, a crosstalk detection signal in a connected line, and receives, through a second user port, an error sample of an actual downlink signal fed back by a terminal side in a connected line, where the actual downlink signal includes far-end crosstalk imposed by the crosstalk detection signal to the line connected to the second user port.

The DSLAM provided in the embodiment of the present invention may include a first user port and a second user port. In the embodiment of the present invention, the first user port is used to send an SELT test signal, and is connected to a line; the second user port is used to send a non-SELT test signal (for example, a signal of a user who has been activated or is being activated), and is connected to another line. The second user port is used as a general term of user ports sending a non-SELT test signal; and the number of second user ports may be one or more. The crosstalk detection signal is mainly used to detect crosstalk imposed, to a signal transmitted in the line connected to the second user port, by a signal transmitted in the line connected to the first user port.

Step 102: The DSLAM estimates, according to the error sample of the actual downlink signal and the crosstalk detection signal, a coefficient of a pre-coder of the DSLAM to obtain an estimated coefficient of the pre-coder. The coefficient of the pre-coder is used to cancel far-end crosstalk on the line connected to the second user port when the first user port sends an SELT signal.

One DSLAM may include one pre-coder, where the coefficient of the pre-coder may be used to cancel far-end crosstalk suffered by lines connected to all second user ports in the DSLAM. One DSLAM may also include multiple pre-coders, with one pre-coder corresponding to one or more second user ports, and the coefficient of each pre-coder may be used to cancel far-end crosstalk suffered by a line connected to a second user port corresponding to the pre-coder.

In the signal processing method provided in the embodiment of the present invention, before an SELT signal is sent, a crosstalk detection signal is sent, and a coefficient of a pre-coder of a DSLAM is estimated to obtain an estimated coefficient of the pre-coder; and then when an SELT test signal is sent, the estimated coefficient of the pre-coder is used to cancel far-end crosstalk possibly suffered by a line. In this way, the problem in the prior art that the SELT test signal imposes crosstalk on neighboring lines is effectively solved.

Figure 2:
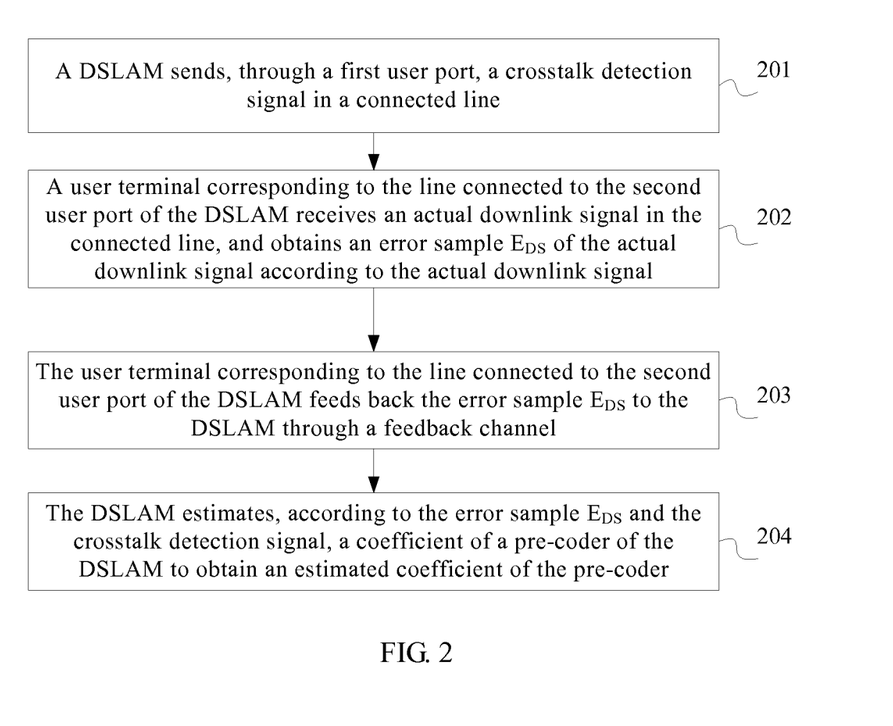
FIG. 2 is a flowchart of a signal processing method according to another embodiment of the present invention.

FIG. 2 is a flowchart of a signal processing method according to another embodiment of the present invention. As shown in FIG. 2, a specific signal processing method is provided in this embodiment, where a user terminal side corresponding to a line connected to a second user port of a DSLAM may be different types of VDSL terminals, for example, a VDSL2, but the specific type of VDSL terminal sets no limit on the protection scope of the embodiment of the present invention. The method includes the following steps:

Step 201: A DSLAM sends, through a first user port, a crosstalk detection signal in a connected line.

The DSLAM provided in the embodiment of the present invention may include a first user port and a second user port. In the embodiment of the present invention, the first user port is used to send an SELT test signal, and is connected to a line; the second user port is used to send a non-SELT test signal (for example, a signal of a user who has been activated or is being activated), and is connected to another line. The second user port is used as a general term of user ports sending a non-SELT test signal, and the number of second user ports may be one or more.

The crosstalk detection signal is mainly used to detect crosstalk imposed, to a signal transmitted in the line connected to the second user port, by a signal transmitted in the line connected to the first user port.

Step 202: A user terminal corresponding to the line connected to the second user port of the DSLAM receives an actual downlink signal in the connected line, and obtains an error sample $E_{DS}$ of the actual downlink signal according to the actual downlink signal.

The actual downlink signal in the line received by the user terminal not only includes a reference downlink signal sent by the DSLAM, but also may include external noise, FEXT imposed, to the line connected to the second user port, by signals sent in lines connected to other second user ports, and FEXT imposed, to the line connected to the second user port, by the crosstalk detection signal sent in the line connected to the first user port.

When the user terminal is a terminal of VDSL2 type, the user terminal may receive the actual downlink signal through a VDSL2 transceiver unit at remote side (VDSL2 Transceiver Unit at Remote side, VTU-R for short). The DSLAM may send a reference downlink signal through a VDSL2 transceiver unit at central office (VDSL2 Transceiver Unit at Central Office, VTU-O for short). This embodiment is described in detail by taking the user terminal being a terminal of VDSL2 type as an example, but is not intended to limit the protection scope of the present invention.

Specifically, a calculation manner of the actual downlink signal $y_0$ may be described as follows:

Assuming that the DSLAM provided in the embodiment of the present invention has K activated lines (the value of index i ranges from 0 to K−1), that is, there are K second user ports, with each second user port connected to one activated line (0 to K−1), when line K sends a crosstalk detection signal, the actual downlink signal $y_0$ received by interfered line 0 at the terminal side is as follows:

$$y_0 = H_{0,0} x_0 + \sum_{i=1}^{K-1} H_{0,i} x_i + H_{0,K} x_K + n_0 \quad (1)$$

where:

$H_{0,0}$: represents a direct channel transmission function of interfered line 0;

$x_0$: represents a data symbol of interfered line 0, with the square error of $\sigma_0^2$;

$H_{0,i}$: represents a channel transmission function of FEXT imposed by vectored line i=1 ... K−1 to interfered line 0;

$x_i$: represents a data symbol of vectored line i=1 ... K, with the square error of $\sigma_i^2$;

$H_{0,K}$: represents a channel transmission function of FEXT imposed by line K to interfered line 0;

$x_K$: represents a data symbol of line K, with the square error of $\sigma_K^2$;

$n_0$: represents external noise of interfered line 0, with the square error of $\sigma_n^2$;

$H_{0,0} x_0$: represents a wanted signal of interfered line 0;

$$\sum_{i=1}^{K-1} H_{0,i} x_i:$$

represents FEXT suffered by interfered line 0 and imposed by an activated line; and $H_{0,K} x_K$: represents FEXT suffered by interfered line 0 and imposed by line K.

Figure 3:
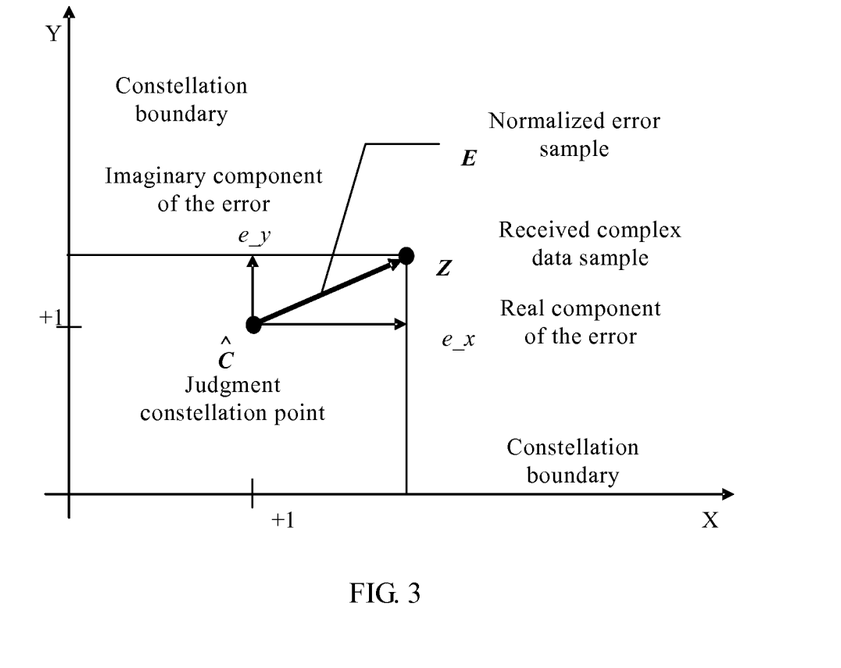
FIG. 3 illustrates a calculation of a normalized error sample E on a specific subcarrier of a synchronization symbol according to an embodiment of the present invention.

The obtaining, by the VTU-R, an error sample $E_{DS}$ according to the actual downlink signal may specifically include: transforming, by the VTU-R, a received actual downlink signal (a time domain signal) into a frequency domain signal through fast Fourier transformation, where each subcarrier in the line connected to the second user port corresponds to one frequency domain signal and a complex variable $Z_{DS}$ is used to represent the frequency domain signal received on each subcarrier; and then, demapping, through constellation demapping, the complex variable $Z_{DS}$ corresponding to each subcarrier to a decision constellation point, where the decision constellation point is represented by $C_{DS}$; and normalizing the complex variable $Z_{DS}$ corresponding to each subcarrier to a quadrature amplitude modulation (Quadrature amplitude modulation, QAM for short) constellation point, where a set of errors between the QAM constellation point and the decision constellation point corresponding to each subcarrier is the error sample $E_{DS}$ of the actual downlink signal. FIG. 3 illustrates a calculation of a normalized error sample E on a specific subcarrier of a synchronization symbol according to an embodiment of the present invention. Taking FIG. 3 as an example, a received complex variable Z is located in a constellation boundary of the decision constellation point $\hat{C}=(+1, +1)$. For each subcarrier, a complex normalized error E is defined as $E=Z-\hat{C}$, where E represents a complex variable and may be represented as follows: $E=e\_x+j\times e\_y$ ($e\_x$ represents a real component and $e\_y$ represents an imaginary component); Z represents a received data sample and may be represented as follows: $Z=z\_x+j\times z\_y$ ($z\_x$ represents a real component and $z\_y$ represents an imaginary component); $\hat{C}$ represents a decision constellation point corresponding to the received data sample and may be represented as follows: $\hat{C}=\hat{c}\_x+j\times \hat{c}\_y$ ($\hat{c}\_x$ represents a real component, $\hat{c}\_y$ represents an imaginary component, and $\hat{c}\_x=\pm 1$, $\hat{c}\_y=\pm 1$).

Step 203: The user terminal corresponding to the line connected to the second user port of the DSLAM feeds back the error sample $E_{DS}$ to the DSLAM through a feedback channel.

An activated line connected to each second user port establishes a feedback channel between the VTU-O and the VTU-R, and the VTU-R should send, according to the received actual downlink signal, the obtained error sample to the VTU-O through the feedback channel. The feedback channel may be a 2-layer feedback channel, an embedded operations channel (Embedded operations channel, EOC for short) feedback channel, a special operations channel (special operations channel, SOC for short) feedback channel, and the like.

Step 204: The DSLAM estimates, according to the error sample $E_{DS}$ and the crosstalk detection signal, a coefficient of a pre-coder of the DSLAM to obtain an estimated coefficient of the pre-coder.

After the estimated coefficient of the pre-coder is obtained, the pre-coder can pre-encode a downlink signal of the second user port by using the estimated coefficient, so that the FEXT caused when the first user port sends an SELT signal is effectively eliminated.

The coefficient of the pre-coder of the DSLAM may be estimated by using multiple algorithms. In the embodiment of the present invention, the coefficient of the pre-coder of the DSLAM is estimated by using a least mean square (Least Mean Square, LMS for short) algorithm. Details are as follows:

To calculate a downlink crosstalk coefficient, that is, a crosstalk channel $$C_{0,K} = \frac{H_{0,K}}{H_{0,0}}$$

imposed to line 0 by line K, the following formula derivation needs to be performed:

$$C_{0,k}(n+1) = C_{0,k}(n) + u \cdot E_{DS} \cdot Z^*$$

z: represents a crosstalk detection signal sent by line K;

z*: represents a conjugate of the crosstalk detection signal z sent by line K;

u: represents an iteration step of the LMS algorithm;

$E_{DS}$: represents the error sample of the actual downlink signal;

n: represents the $n^{th}$ iteration; and $C_{0,k}(n)$: represents an estimated crosstalk channel value during the $n^{th}$ iteration.

Figure 4:
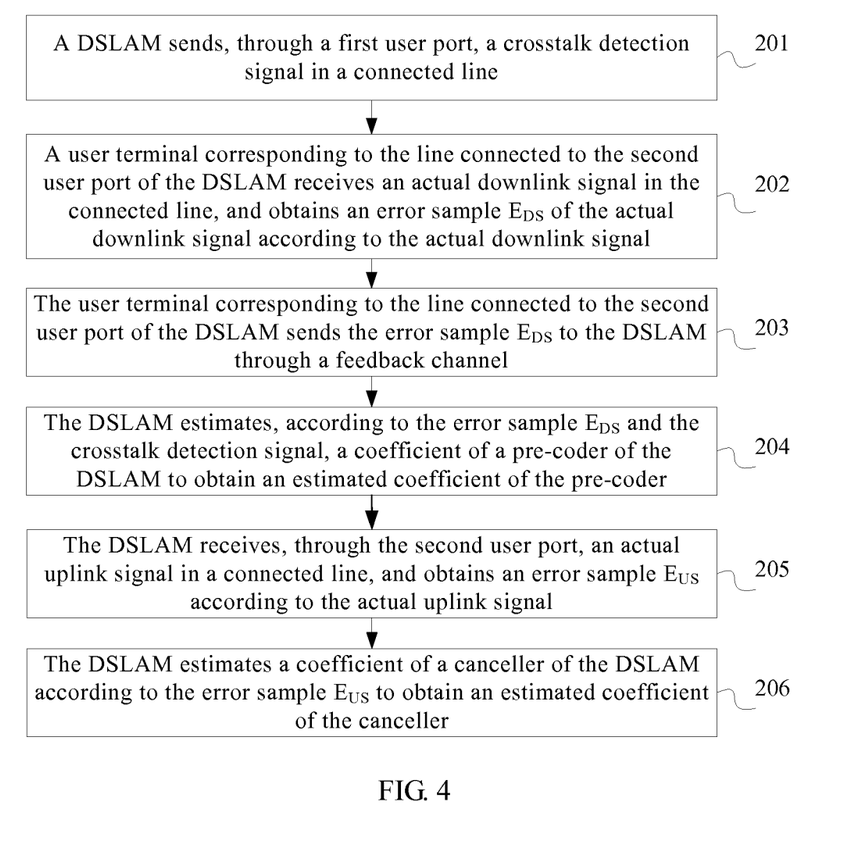
FIG. 4 is a flowchart of a signal processing method according to another embodiment of the present invention.

Further, FIG. 4 is a flowchart of a signal processing method according to another embodiment of the present invention. After step 204, the method may further include the following steps, which are used to further solve the impact imposed to other users by near-end crosstalk generated when an SELT test signal is sent.

Step 205: The DSLAM receives, through the second user port, an actual uplink signal in a connected line, and obtains an error sample $E_{US}$ according to the actual uplink signal.

The actual uplink signal not only includes a reference uplink signal but also may include near-end crosstalk imposed to the line connected to the second user port when the first user port sends a crosstalk detection signal. When the DSLAM sends a crosstalk detection signal of an uplink signal frequency band through the first user port, NEXT crosstalk is imposed to the line connected to the second user port. Therefore, in step 205, a method of using an uplink frequency band signal in an Echo signal of the first user port to cancel uplink NEXT interference suffered by the second user port is provided.

Step 205 may specifically include: transforming, by a VTU-O of the line connected to the second user port, a received actual uplink signal (time domain signal) into a frequency domain signal through fast Fourier transformation, where each subcarrier in the line connected to the second user port corresponds to one frequency domain signal and a complex variable $Z_{US}$ is used to represent the frequency domain signal received by each subcarrier in the line; then, demapping, through constellation demapping, the complex variable $Z_{US}$ corresponding to each subcarrier to a decision constellation point, where the decision constellation point is represented by $\hat{C}_{US}$; and normalizing the complex variable $Z_{US}$ corresponding to each subcarrier to a QAM constellation point, where a set of errors between the QAM constellation point and the decision constellation point that are corresponding to each subcarrier is the error sample $E_{US}$ of the actual uplink signal. For the specific calculation method, reference may be made to the calculation method of $E_{DS}$ in step 102, which is not further described herein.

Step 206: The DSLAM estimates a coefficient of a canceller of the DSLAM according to the error sample $E_{US}$ to obtain an estimated coefficient of the canceller.

After the estimated coefficient of the canceller is obtained, the canceller can perform crosstalk cancellation on an uplink signal by using the estimated coefficient to cancel the NEXT effectively.

The coefficient of the canceller of the DSLAM may be estimated by using multiple algorithms. In the embodiment of the present invention, the coefficient of the canceller of the DSLAM is estimated by using an LMS algorithm. For the specific calculation method, reference may be made to step 204, which is not further described herein.

In one implementation manner, on the basis of the foregoing embodiment, after step 204 or step 206, the embodiment of the present invention further includes the following step: The DSLAM sends an SELT test signal through the first user port.

In the signal processing method provided in the embodiment of the present invention, before an SELT signal is sent, a crosstalk detection signal is sent, and coefficients of a pre-coder and a canceller of a DSLAM are estimated to obtain an estimated coefficient of the pre-coder and an estimated coefficient of the canceller; and then when an SELT test signal is sent, the estimated coefficient of the pre-coder is used to cancel far-end crosstalk possibly suffered by a line and the estimated coefficient of the canceller is used to cancel near-end crosstalk possibly on the line. In this way, the problem in the prior art that the SELT test signal imposes crosstalk on neighboring lines is effectively solved.

Figure 5:
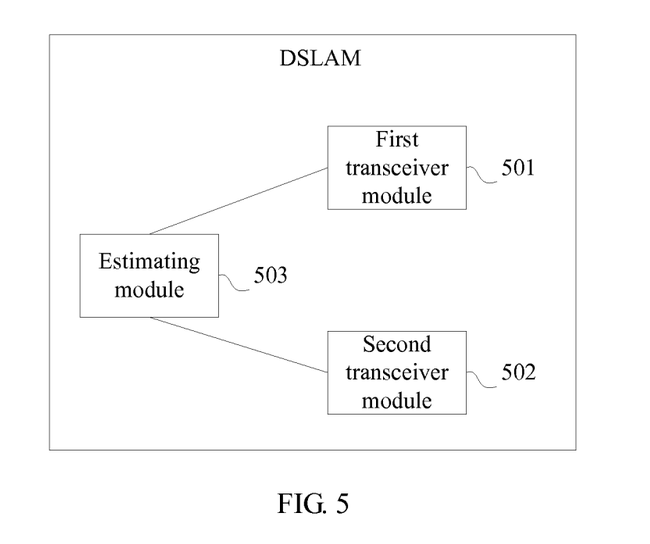
FIG. 5 is a schematic structural diagram of a DSLAM according to an embodiment of the present invention.

FIG. 5 is a schematic structural diagram of a DSLAM according to an embodiment of the present invention. The DSLAM provided in the foregoing method embodiments is a specific implementation form of the DSLAM provided in the embodiment of the present invention. As shown in FIG. 5, the DSLAM includes a first transceiver module 501, a second transceiver 502, and an estimating module 503. The first transceiver module 501 is configured to send a crosstalk detection signal; the second transceiver module 502 is configured to receive an error sample of an actual downlink signal fed back by a terminal side, where the actual downlink signal includes far-end crosstalk imposed by the crosstalk detection signal to a line connected to the second transceiver module 502; and the estimating module 503 is configured to obtain an estimated coefficient of a pre-coder according to the crosstalk detection signal sent by the first transceiver module 501 and the error sample of the actual downlink signal received by the second transceiver module 502, where the pre-coder is configured to cancel FEXT on the line connected to the second transceiver module 502 when the first transceiver module 501 sends an SELT signal.

The estimating module 503 may estimate the coefficient of the pre-coder in the following manner:

$$C_{0,k}(n+1) = C_{0,k}(n) + u \cdot E_{DS} \cdot Z^*$$

where $C_{0,K}$ represents a downlink crosstalk coefficient imposed to line 0 by line K in the pre-coder, n represents the $n^{th}$ iteration, u represents an iteration step of an estimation algorithm, z* represents a conjugate of a crosstalk detection signal z sent by line K, and $E_{DS}$ represents the error sample of the actual downlink signal, where line K is a line connected to the first transceiver module 501 and line 0 is the line connected to the second transceiver module 502.

In another implementation manner, the second transceiver module 502 is further configured to receive an actual uplink signal, and obtain an error sample of the actual uplink signal according to the actual uplink signal, where the actual uplink signal includes near-end crosstalk imposed by the crosstalk detection signal to the line connected to the second transceiver module 502. The estimating module 503 is further configured to estimate a coefficient of a canceller according to the error sample of the actual uplink signal and the crosstalk detection signal to obtain an estimated coefficient of the canceller. The canceller is configured to cancel the NEXT on the line connected to the second transceiver module 502 when the first transceiver module 501 sends an SELT signal.

The second transceiver module 502 includes an obtaining unit configured to obtain the error sample of the actual uplink signal according to the actual uplink signal, where the obtaining unit includes a transforming subunit, a demapping subunit, a normalizing subunit, and an obtaining subunit. The transforming subunit is configured to transform the received actual uplink signal into a frequency domain signal through fast Fourier transformation, where each subcarrier in the line connected to the second transceiver module 502 corresponds to one frequency domain signal; the demapping subunit is configured to demap, through constellation demapping, the frequency domain signal corresponding to each subcarrier to a decision constellation point; the normalizing subunit is configured to normalize the frequency domain signal corresponding to each subcarrier to a quadrature amplitude modulation constellation point; and the obtaining subunit is configured to obtain an error between the quadrature amplitude modulation constellation point and the decision constellation point that are corresponding to each subcarrier, where a set of the errors is the error sample of the actual uplink signal.

The estimating module 503 estimates the coefficient of the canceller in the following manner:

$$C_{0,k}(n+1) = C_{0,k}(n) + u \cdot E_{US} \cdot Z^*$$

where $C_{0,K}$ represents an uplink crosstalk coefficient imposed to line 0 by line K in the canceller, n represents the $n^{th}$ iteration, u represents an iteration step of an estimation algorithm, z represents a conjugate of a crosstalk detection signal z sent by line K, and $E_{US}$ represents the error sample of the actual uplink signal, where line K is a line connected to the first transceiver module 501 and line 0 is the line connected to the second transceiver module 502.

In the DSLAM provided in the embodiment of the present invention, before an SELT signal is sent, a crosstalk detection signal is sent, and coefficients of a pre-coder and a canceller of the DSLAM are estimated to obtain an estimated coefficient of the pre-coder and an estimated coefficient of the canceller; and then when an SELT test signal is sent, the estimated coefficient of the pre-coder is used to cancel far-end crosstalk possibly suffered by a line and the estimated coefficient of the canceller is used to cancel near-end crosstalk possibly on the line. In this way, the problem in the prior art that the SELT test signal imposes crosstalk on neighboring lines is effectively solved.

Figure 6:
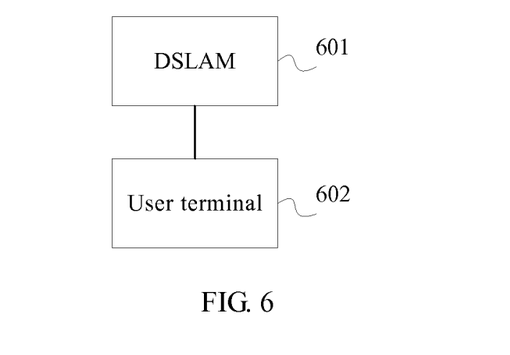
FIG. 6 is a schematic structural diagram of a signal processing system according to an embodiment of the present invention.

FIG. 6 is a schematic structural diagram of a signal processing system according to an embodiment of the present invention. As shown in FIG. 6, the system includes a DSLAM 601 and a user terminal 602. For executive processes of the DSLAM 601 and the user terminal 602, reference may be made to the foregoing method embodiments, which are not further described herein. Specifically, the DSLAM 601 is configured to send, through a first user port, a crosstalk detection signal in a connected line, receive, through a second user port, an error sample of an actual downlink signal fed back by the user terminal 602 in a connected line, where the actual downlink signal includes far-end crosstalk imposed by the crosstalk detection signal to the line connected to the second user port, and estimate, according to the error sample of the actual downlink signal and the crosstalk detection signal, a coefficient of a pre-coder of the DSLAM 601 to obtain an estimated coefficient of the pre-coder, where the estimated coefficient of the pre-coder is used to cancel far-end crosstalk on the line connected to the second user port when the first user port sends an SELT signal; and the user terminal 602 is configured to estimate, according to a received actual downlink signal which is sent through the second user port by the DSLAM 601 in the connected line, an error sample of the actual downlink signal, and feed back the error sample of the actual downlink signal to the DSLAM 601.

In another implementation manner, the DSLAM 601 is further configured to receive, through a second user port, an actual uplink signal in a connected line, obtain, according to the actual uplink signal, an error sample of the actual uplink signal, where the actual uplink signal includes near-end crosstalk imposed, to the line connected to the second user port, by the crosstalk detection signal, and estimate a coefficient of a canceller of the DSLAM 601 according to the error sample of the actual uplink signal to obtain an estimated coefficient of the canceller, where the coefficient of the canceller is used to cancel near-end crosstalk on the line connected to the second user port when the first user port sends an SELT test signal.

In the signal processing system provided in the embodiment of the present invention, before an SELT signal is sent, a crosstalk detection signal is sent, and coefficients of a pre-coder and a canceller of a DSLAM are estimated to obtain an estimated coefficient of the pre-coder and an estimated coefficient of the canceller; and when an SELT test signal is sent, the estimated coefficient of the pre-coder is used to cancel far-end crosstalk possibly suffered by a line and the estimated coefficient of the canceller is used to cancel near-end crosstalk possibly on the line. In this way, the problem in the prior art that the SELT test signal imposes crosstalk on neighboring lines is effectively solved.

Persons of ordinary skill in the art may understand that, all or a part of the steps of the foregoing method embodiments may be implemented by a program instructing relevant hardware. The foregoing programs may be stored in a computer readable storage medium. When the program runs, the foregoing steps of the method embodiments are performed. The foregoing storage medium includes various mediums capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, as long as the modifications and replacements do not cause the essence of corresponding technical solutions to depart from the spirit and scope of the technical solutions of the embodiments of the present invention.

What is claimed is:

1. A signal processing method, comprising:
sending, by a digital subscriber line access multiplexer DSLAM, through a first user port, a crosstalk detection signal in a connected line, and receiving, by the DSLAM, through a second user port, an error sample of an actual downlink signal fed back by a terminal side in another connected line connected to the second user port, wherein the actual downlink signal comprises far-end crosstalk imposed by the crosstalk detection signal to the line connected to the second user port; and
estimating, by the DSLAM, according to the error sample of the actual downlink signal and the crosstalk detection signal, a coefficient of a pre-coder of the DSLAM to obtain an estimated coefficient of the pre-coder;
sending, by the DSLAM, through the first user port, a single end line test SELT signal, wherein the coefficient of the pre-coder is used to cancel far-end crosstalk on the line connected to the second user port when the first user port sends the SELT signal.

2. The method according to claim 1, wherein the estimating, according to the error sample of the actual downlink signal and the crosstalk detection signal, a coefficient of a pre-coder of the DSLAM comprises:

$$C_{0,k}(n+1)=C_{0,k}(n)+u \cdot E_{DS} \cdot Z^*$$

wherein $C_{0,K}$ represents a downlink crosstalk coefficient imposed to line 0 by line K in the pre-coder, n represents the $n^{th}$ iteration, u represents an iteration step of an estimation algorithm, $z^*$ represents a conjugate of a crosstalk detection signal z sent by line K, and $E_{DS}$ represents the error sample of the actual downlink signal, wherein line K is a line connected to the first user port and line 0 is the line connected to the second user port.

3. The method according to claim 1, wherein after the estimating, according to the error sample of the actual downlink signal and the crosstalk detection signal, a coefficient of a pre-coder of the DSLAM to obtain an estimated coefficient of the pre-coder, the method further comprises:

receiving, by the DSLAM, through the second user port, an actual uplink signal in a connected line, and obtaining an error sample of the actual uplink signal according to the actual uplink signal, wherein the actual uplink signal comprises near-end crosstalk imposed by the crosstalk detection signal to the line connected to the second user port; and estimating, by the DSLAM, according to the error sample of the actual uplink signal and the crosstalk detection signal, a coefficient of a canceller of the DSLAM to obtain an estimated coefficient of the canceller, wherein the coefficient of the canceller is used to cancel near-end crosstalk on the line connected to the second user port when the first user port sends an SELT signal.

4. The method according to claim 3, wherein the obtaining an error sample of the actual uplink signal according to the actual uplink signal comprises:

transforming the received actual uplink signal into a frequency domain signal through fast Fourier transformation, wherein each subcarrier on the line connected to the second user port corresponds to one frequency domain signal;

demapping, through constellation demapping, the frequency domain signal corresponding to each subcarrier to a decision constellation point;

normalizing the frequency domain signal corresponding to each subcarrier to a quadrature amplitude modulation constellation point; and obtaining an error between the quadrature amplitude modulation constellation point and the decision constellation point that are corresponding to each subcarrier, wherein a set of the errors is the error sample of the actual uplink signal.

5. The method according to claim 3, wherein the estimating, according to the error sample of the actual uplink signal and the crosstalk detection signal, a coefficient of a canceller of the DSLAM comprises:

$$C_{0,k}(n+1)=C_{0,k}(n)+u \cdot E_{US} \cdot Z^*$$

wherein $C_{0,K}$ represents a downlink crosstalk coefficient imposed to line 0 by line K in the canceller, n represents the $n^{th}$ iteration, u represents an iteration step of an estimation algorithm, $z^*$ represents a conjugate of a crosstalk detection signal z sent by line K, and $E_{US}$ represents the error sample of the actual uplink signal, wherein line K is a line connected to the first user port and line 0 is the line connected to the second user port.

6. A digital subscriber line access multiplexer DSLAM, comprising:

non-transitory computer readable storage medium to store program(s), and computer hardware configured, including configured by the program(s), to implement modules comprising:

a first transceiver module, configured to send a crosstalk detection signal and a single end line test SELT signal to a terminal through a line;

a second transceiver module, configured to receive an error sample of an actual downlink signal fed back by a terminal side on another line connected to the second transceiver module, wherein the actual downlink signal comprises far-end crosstalk imposed by the crosstalk detection signal to a line connected to the second transceiver module; and an estimating module, configured to obtain an estimated coefficient of a pre-coder according to the crosstalk detection signal sent by the first transceiver module and the error sample of the actual downlink signal received by the second transceiver module, wherein the coefficient of the pre-coder is used to cancel far-end crosstalk on the line connected to the second transceiver module when the first transceiver module sends the SELT signal.

7. The DSLAM according to claim 6, wherein the estimating module estimates the coefficient of the pre-coder in the following manner:

$$C_{0,k}(n+1)=C_{0,k}(n)+u \cdot E_{DS} \cdot Z^*$$

wherein $C_{0,K}$ represents a downlink crosstalk coefficient imposed to line 0 by line K in the pre-coder, n represents the $n^{th}$ iteration, u represents an iteration step of an estimation algorithm, $z^*$ represents a conjugate of a crosstalk detection signal z sent by line K, and $E_{DS}$ represents the error sample of the actual downlink signal, wherein line K is a line connected to the first transceiver module and line 0 is the line connected to the second transceiver module.

8. The DSLAM according to claim 6, wherein the second transceiver module is further configured to: receive an actual uplink signal, and obtain an error sample of the actual uplink signal according to the actual uplink signal, wherein the actual uplink signal comprises near-end crosstalk imposed, to the line connected to the second transceiver module, by the crosstalk detection signal; and the estimating module is further configured to estimate, according to the error sample of the actual uplink signal and the crosstalk detection signal, a coefficient of a canceller of the DSLAM to obtain an estimated coefficient of the canceller, wherein the coefficient of the canceller is used to cancel near-end crosstalk on the line connected to the second transceiver module when the first transceiver module sends an SELT signal.

9. The DSLAM according to claim 8, wherein the second transceiver module implements an obtaining unit configured to obtain the error sample of the actual uplink signal according to the actual uplink signal, wherein the obtaining unit implements:

a transforming subunit, configured to transform the received actual uplink signal into a frequency domain signal through fast Fourier transformation, wherein each subcarrier on the line connected to the second transceiver module corresponds to one frequency domain signal;

a demapping subunit, configured to demap, through constellation demapping, the frequency domain signal corresponding to each subcarrier to a decision constellation point;

a normalizing subunit, configured to normalize the frequency domain signal corresponding to each subcarrier to a quadrature amplitude modulation constellation point; and an obtaining subunit, configured to obtain an error between the quadrature amplitude modulation constellation point and the decision constellation point that are corresponding to each subcarrier, wherein a set of the errors is the error sample of the actual uplink signal.

10. The DSLAM according to claim 8, wherein the estimating module estimates the coefficient of the canceller in the following manner:

$$C_{0,k}(n+1)=C_{0,k}(n)+u \cdot E_{US} \cdot Z^*$$

wherein $C_{0,K}$ represents an uplink crosstalk coefficient imposed to line 0 by line K in the canceller, n represents the $n^{th}$ iteration, u represents an iteration step of an estimation algorithm, $z^*$ represents a conjugate of a crosstalk detection signal z sent by line K, and $E_{US}$ represents the error sample of the actual uplink signal, wherein line K is a line connected to the first transceiver module and line 0 is the line connected to the second transceiver module.

11. A signal processing system, comprising:
a digital subscriber line access multiplexer DSLAM; and
a user terminal;
wherein the DSLAM is configured to send, through a first user port, a crosstalk detection signal in a connected line, receive, through a second user port, an error sample of an actual downlink signal fed back by the user terminal in a connected line, wherein the actual downlink signal comprises far-end crosstalk imposed by the crosstalk detection signal to the line connected to the second user port, estimate, according to the error sample of the actual downlink signal and the crosstalk detection signal, a coefficient of a pre-coder of the DSLAM to obtain an estimated coefficient of the pre-coder, and send, through the first user port, a single end line test SELT signal, wherein the coefficient of the pre-coder is used to cancel far-end crosstalk on the line connected to the second user port when the first user port sends the SELT signal; and the user terminal is configured to estimate, according to a received actual downlink signal which is sent through the second user port by the DSLAM in the connected line, an error sample of the actual downlink signal, and feed back the error sample of the actual downlink signal to the DSLAM.

12. The system according to claim 11, wherein the DSLAM is further configured to: receive, through the second user port, an actual uplink signal in a connected line, obtain, according to the actual uplink signal, an error sample of the actual uplink signal, wherein the actual uplink signal comprises near-end crosstalk imposed by the crosstalk detection signal to the line connected to the second user port, and estimate, according to the error sample of the actual uplink signal and the crosstalk detection signal, a coefficient of a canceller of the DSLAM to obtain an estimated coefficient of the canceller, wherein the coefficient of the canceller is used to cancel near-end crosstalk on the line connected to the second user port when the first user port sends an SELT signal.

* * * * *